United States Patent
Hawkins et al.

(10) Patent No.: US 6,443,413 B1
(45) Date of Patent: Sep. 3, 2002

(54) ADJUSTABLE JACK STAND

(75) Inventors: Joseph O. Hawkins, Greer; John H. Blackburn, Greenville; Fred Schliesseit, Greer, all of SC (US)

(73) Assignee: Sunex International, Inc., Greenville, SC (US)

( * ) Notice: Subject to any disclaimer, the term of this patent is extended or adjusted under 35 U.S.C. 154(b) by 0 days.

(21) Appl. No.: 09/724,074

(22) Filed: Nov. 28, 2000

(51) Int. Cl.$^7$ .................................................. A47F 5/00
(52) U.S. Cl. ................. 248/352; 248/354.5; 248/354.7; 403/379.5
(58) Field of Search ............... 248/352, 354.5, 248/354.7; 254/108; D34/31; 403/379.5, 109.6

(56) References Cited

U.S. PATENT DOCUMENTS

| | | | | |
|---|---|---|---|---|
| 2,504,291 A | * | 4/1950 | Alderfer | 254/98 |
| 3,178,146 A | * | 4/1965 | Goodale | 248/352 |
| D215,746 S | * | 10/1969 | Hunnicutt | D34/31 |
| 3,737,147 A | * | 6/1973 | Morgan et al. | 254/108 |
| 3,802,658 A | | 4/1974 | Binding | 248/352 |
| 4,021,012 A | * | 5/1977 | Miller | 248/352 |
| 4,042,202 A | | 8/1977 | Molinari | 248/352 |
| 4,540,147 A | * | 9/1985 | Lincourt | 248/352 |
| 4,690,361 A | | 9/1987 | Lundman | 248/352 |
| 4,856,747 A | * | 8/1989 | Gano | 248/354.7 |
| 5,110,089 A | | 5/1992 | Slay | 254/8 B |
| 5,180,131 A | | 1/1993 | Few | 248/352 |
| 5,323,997 A | * | 6/1994 | Danaj | 248/354.7 |
| 5,520,360 A | | 5/1996 | Wensman | 248/354.5 |
| 5,901,935 A | * | 5/1999 | Lai | 248/354.1 |

FOREIGN PATENT DOCUMENTS

| | | | | |
|---|---|---|---|---|
| FR | 711417 B1 | * | 9/1931 | 248/352 |
| FR | 980569 B1 | * | 5/1951 | 248/354.5 |

* cited by examiner

Primary Examiner—Leslie A. Braun
Assistant Examiner—Jon A Szumny
(74) Attorney, Agent, or Firm—Dority & Manning, P.A.

(57) ABSTRACT

An improved adjustable jack stand combines a ratchet and pawl height maintenance mechanism with a pin and hole mechanism wherein the holes in the post coordinate with the teeth in the post so that any engagement between the pawl and a tooth ensures that a pair of holes in the base and the post are aligned to receive a pin. Additionally, the pin defines a circular cylindrical shape, and each of the pin support sections likewise defines a corresponding bottom half of a circle, thereby exposing the targeted hole in the ratchet bar for easy viewing by the mechanic. An elongated tether is provided and has one section connected to the body and another section connected to the pin.

8 Claims, 6 Drawing Sheets

ADJUSTABLE JACK STAND

BACKGROUND OF THE INVENTION

The present invention relates to a jack stand and more particularly to a jack stand with a ratchet mechanism for controlling adjustment of the elevation of the saddle.

In the typical adjustable jack stand, there is a base that rests against the floor. A post extends out of and above the base and has a saddle on the exposed end. The load rests against the upper surface of the saddle. The elevation of the saddle can be changed by adjusting the length of the post that extends above the base. The desired elevation of the saddle, and of the load supported by the jack stand, is maintained typically in one of two ways.

In one embodiment, a plurality of holes are drilled through the post and spaced along the length thereof, and a pin is inserted through a hole in the post and a hole through the base to maintain the post at a predetermined elevation above the base. In another embodiment, a plurality of teeth formed on one edge of the post forms a ratchet that engages a pawl that is pivotally mounted on the base and attached to a lifting handle.

In the pin embodiment, it is typical for the pin to have a stay across both ends to prevent inadvertent withdrawal of the pin from the holes that would cause a sudden change in elevation and a commensurate shift in the load. However, this type of height adjustment mechanism also presents certain undesirable limitations. For example, removing one of the stays before removing the pin can be cumbersome, and mechanics tend to overlook replacing the stay or intentionally omitting the stay in order to avoid the inconvenience of dealing with the stay. Moreover, both the removed stay and the pin itself are easily misplaced in the work environment, rendering the jack stand inoperative until at least the pin is found. Additionally, it can be cumbersome to try to align the hole in the base with one of the holes in the post, and the weight of the post can cause it to slip out of alignment before the pin can be inserted through the aligned hole in the post. Such slippage can cause injury to the mechanic.

The ratchet and pawl mechanism does not require the mechanic to take any action to engage the pawl to the teeth on the post in the manner that holds the saddle at the desired elevation. However, the lifting handle can be moved in a manner that causes the pawl to disengage from the teeth on the post. It is possible that someone or something might inadvertently jostle the lifting handle while the jack stand is under load. If the pawl disengages from the post, then the saddle will undergo a sudden change of elevation that may cause the load to shift suddenly. Such sudden movements of the load can damage the load and/or the persons and property in the vicinity of the shifting load.

Moreover, there are a number of other ways for the pawl to be come disengaged from the tooth on the post. The pawl and the teeth on the post typically are cast iron that can break unexpectedly. The pivot pin that carries the pawl also can bend or break. When the height of the post is initially set by the operator of the jack stand, the pawl may not be properly engaged with a tooth, and operator may fail to check for or otherwise detect the improper engagement.

Thus, a need exists for an adjustable jack stand that overcomes these problems.

OBJECTS AND SUMMARY OF THE INVENTION

It is a principal object of the present invention to provide an improved adjustable jack stand.

It is another principal object of the present invention to provide an improved adjustable jack stand that offers an extra measure of safety in use.

It is a further principal object of the present invention to provide an improved adjustable jack stand that offers an extra measure of safety in use without unduly inconveniencing the mechanic.

It is a still further principal object of the present invention to provide an improved adjustable jack stand that offers an extra measure of safety in use without unduly inconveniencing the mechanic by combining a pin and hole height maintenance mechanism with a ratchet and pawl mechanism.

It is yet another principal object of the present invention to provide an improved adjustable jack stand that offers an extra measure of safety in use without unduly inconveniencing the mechanic by combining a ratchet and pawl height maintenance mechanism with a pin and hole mechanism wherein the holes in the post coordinate with the teeth in the post so that any engagement between the pawl and a tooth ensures that a pair of holes in the base and the post are aligned to receive a pin.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the adjustable jack stand of the present invention comprises a ratchet and pawl height adjustment mechanism and a pin and hole height adjustment mechanism that are coordinated with each other. More particularly, the adjustable jack stand comprises a body that defines a hollow interior and defines at least one foot member configured to rest against the surface of the floor. The jack stand body also defines a slide opening that permits access into the interior of the jack stand body.

The jack stand includes an elongated ratchet bar that defines a plurality of teeth disposed side-by-side along most of the length of a first portion of one elongated side edge of the ratchet bar. The first portion of the ratchet bar is slidably received within the slide opening of the jack stand body in a manner that orients the elongated ratchet bar with its axis of elongation parallel to the vertical direction when the foot member is resting on the floor surface. The ratchet bar also defines a plurality of holes disposed transversely therethrough and spaced at predetermined distances along the length of the ratchet bar. Each hole in the ratchet bar has an entrance and an exit disposed opposite the entrance. Desirably, the entrance and exit of each hole of the ratchet bar is recessed.

The jack stand includes a pawl that is pivotally connected to the jack stand body and configured and disposed for selectively engaging at least one of the teeth of the ratchet bar so as to prevent the ratchet bar from movement toward the foot member. A lifting handle is connected in communication with the pawl and is configured and disposed to be selectively positionable so as to release the pawl from engaging the teeth of the ratchet bar. Desirably, the lifting handle is non-rotatably connected to the pawl.

The jack stand includes a safety pin that is removably disposed within one of the plurality of holes of the ratchet bar. The pin is configured to be removably received within each of the plurality of holes of the ratchet bar. The pin is configured to be selectively positionable to protrude beyond each entrance and exit of each hole of the ratchet bar when removably received therein.

The jack stand body defines at least one pair of pin support sections. A first pin support section is disposed on one side of the slide opening, and a second pin support section is disposed on the opposite side of the slide opening and aligned with the first pin support section. Each pin support section is configured to receive and support the safety pin when the safety pin is positioned to protrude beyond each entrance and exit of each hole of the ratchet bar. The locations of the holes of the ratchet bar and the locations of the teeth of the ratchet bar are coordinated with one another and with the pawl in a particular spatial relationship so that any engagement between the pawl and one of the teeth of the ratchet bar ensures that one of the holes in the ratchet bar is aligned with the pair of pin support sections in the jack stand body.

Desirably, the pin defines a circular cylindrical shape, and each of the pin support sections likewise defines a corresponding semi-circular shape. An elongated tether is provided and has one section connected to the body and another section connected to the pin.

The accompanying drawings, which are incorporated in and constitute a part of this specification, illustrate one embodiment of the invention and, together with the description, serve to explain the principles of the invention.

DETAILED DESCRIPTION OF THE PREFERRED EMBODIMENTS

Reference now will be made in detail to the presently preferred embodiments of the invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. The same numerals are assigned to the same components throughout the drawings and description.

Figure 1:
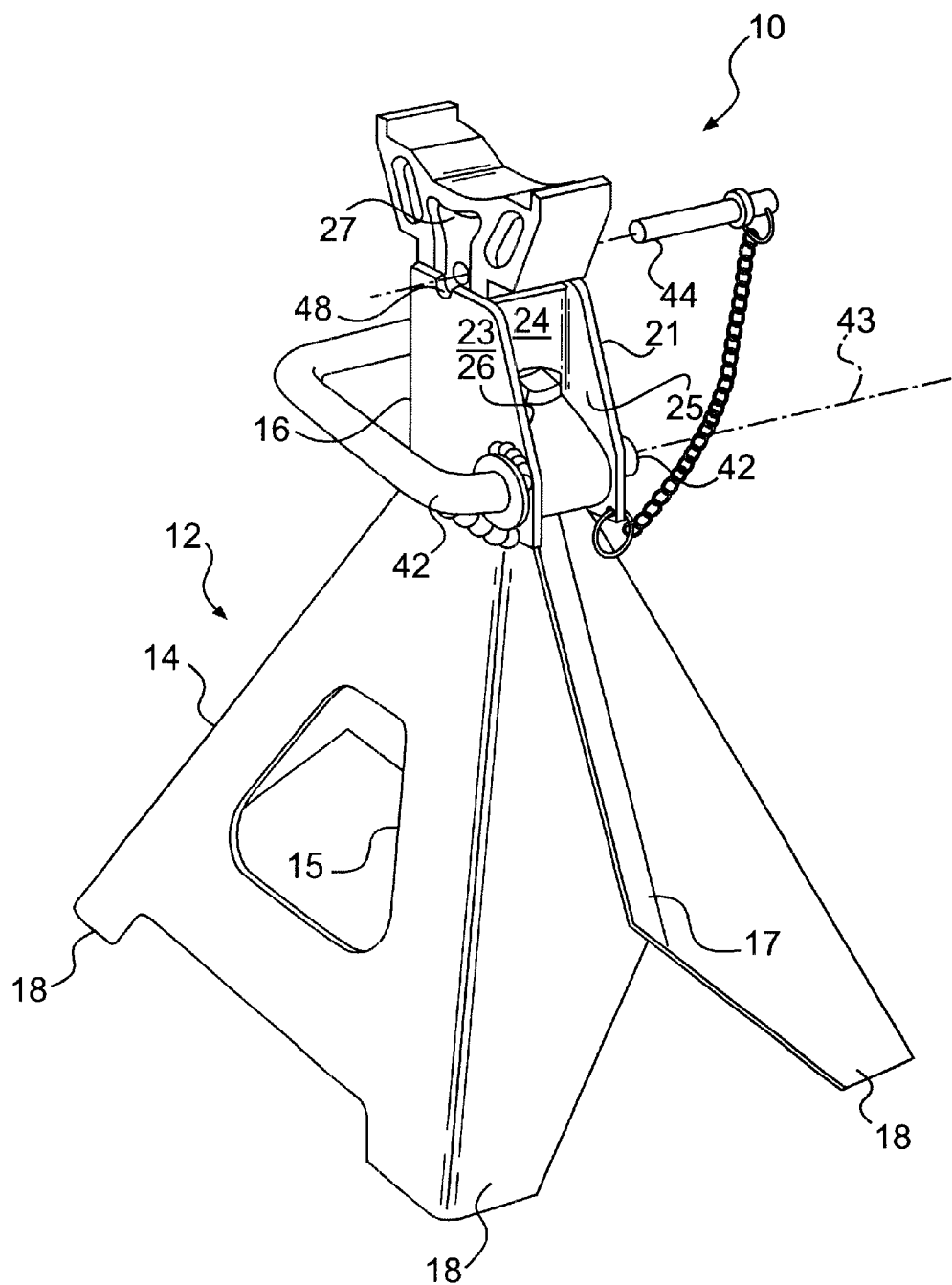
FIG. 1 is an elevated perspective view of a presently preferred embodiment of the jack stand of the present invention.
Figure 2:
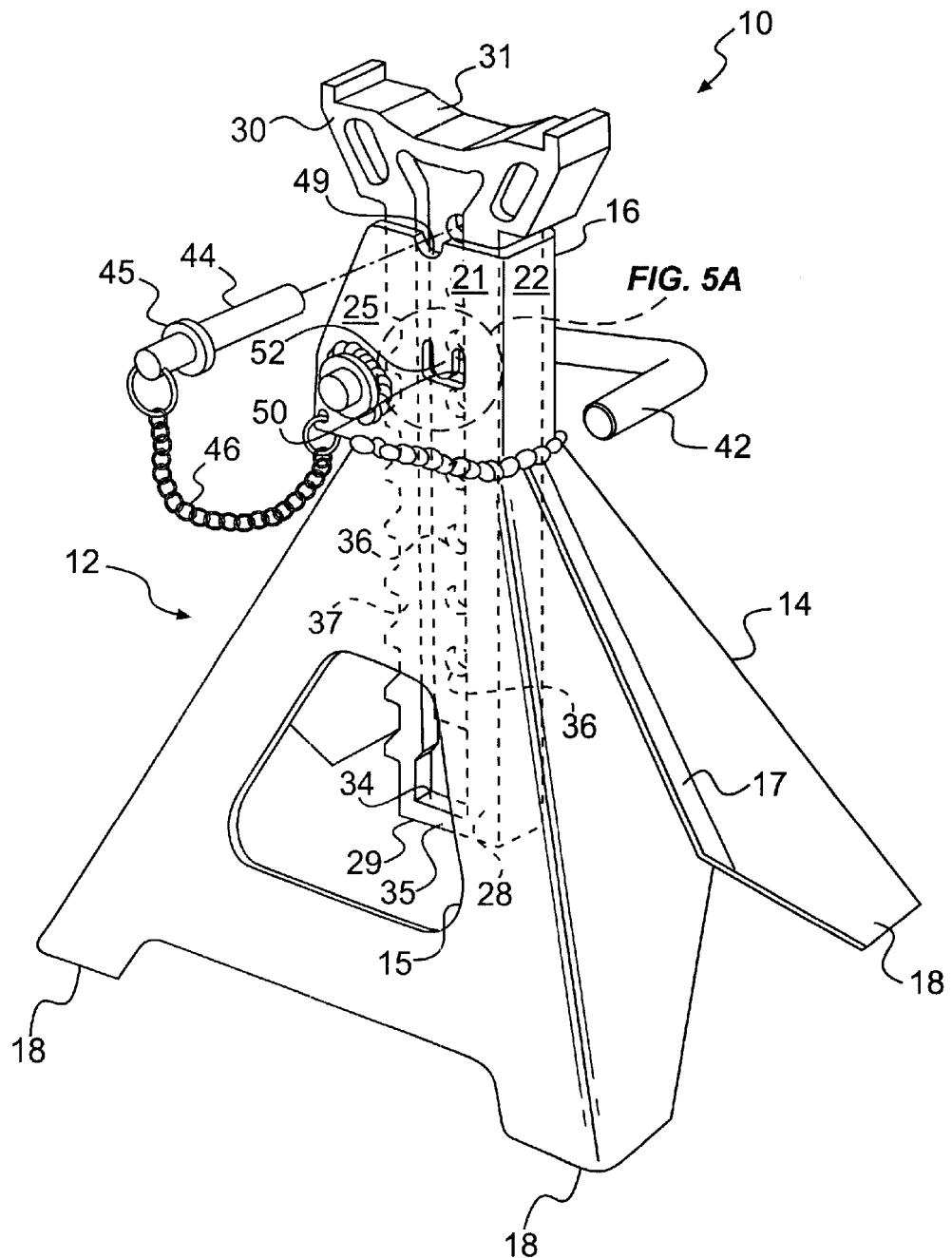
FIG. 2 is an elevated perspective view taken of the opposite side of the jack stand of FIG. 1.
Figure 3:
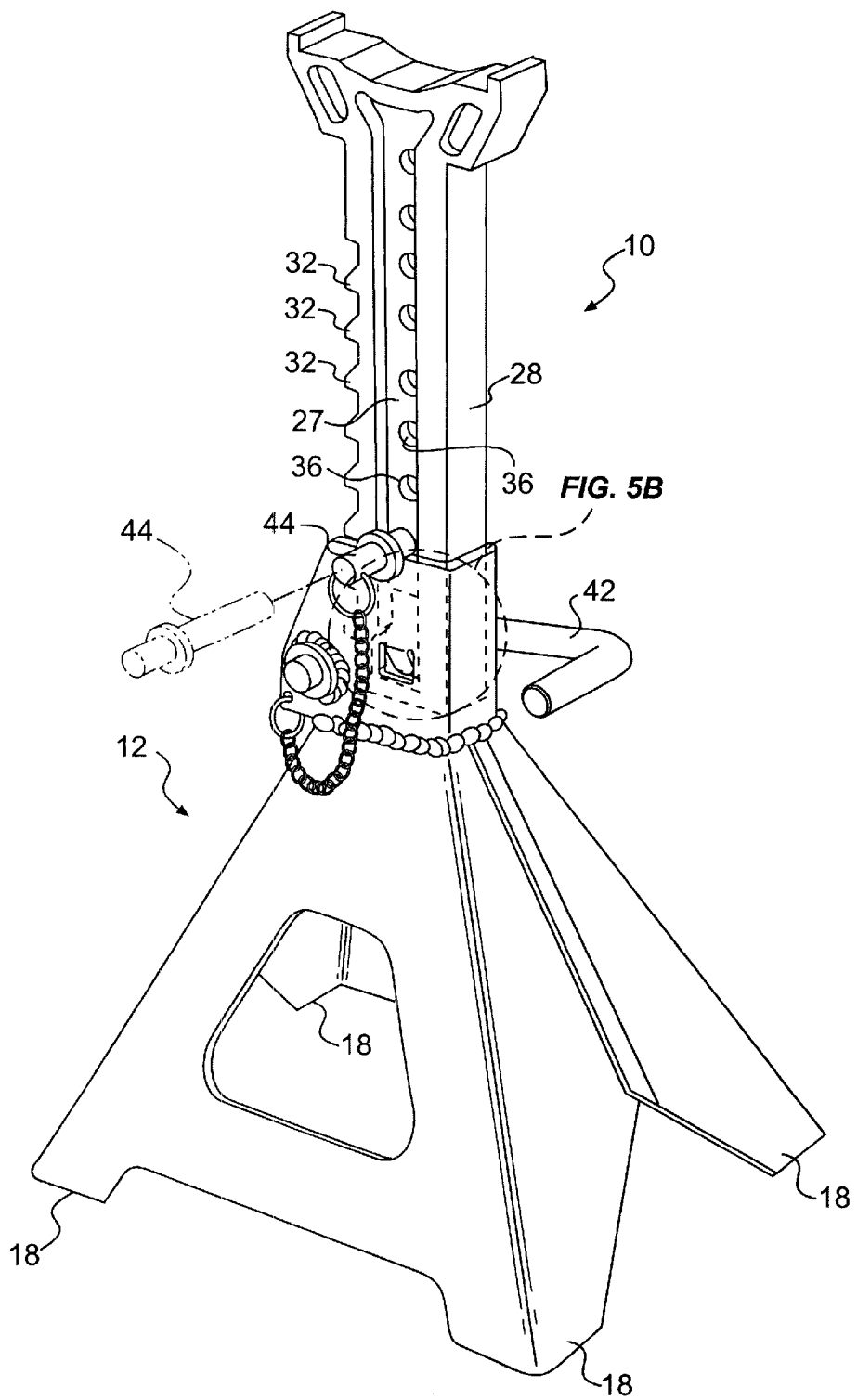
FIG. 3 is an elevated perspective view of the jack stand of FIG. 1 with the saddle elevated and showing in phantom (dashed line) the safety pin removed from the safety position.

A presently preferred embodiment of the jack stand of the present invention is shown in FIGS. 1–4. As shown in FIGS. 1–3 for example, the stand as a whole is designated generally by the numeral 10.

As shown in FIG. 1 for example, jack stand 10 includes a jack stand body 12 which defines generally a base member 14 and a neck member 16 connected to base member 14. As shown in FIG. 2 for example, the uppermost portion of base member 14 can be permanently attached (as by welding) to the lowermost portion or edge of neck member 16. As shown in FIG. 1, base member 14 is desirably formed by 20-gauge steel that has been bent to form a hollow hexahedron that is open at the top and the bottom, and wherein each solid planar face is shaped as a trapezoid. As shown in FIGS. 1 and 2 for example, this four-sided shape which is hollow on the inside can be accomplished by bending a pair of 20 gauge stainless steel sheets to form two halves of the base member 14 and permanently joining (as by welding) the opposite side edges along a seam 17 to form the four facades of the four-sided base member. Thus, two of the four facades can include a seam 17, and a generally trapezoidal-shaped window 15 can be defined in the other two facades. The lowermost edges of the base member can be formed to define at least one foot member 18. As shown in FIGS. 1–3, the base member 14 is desirably configured to define four foot members 18, and each foot member 18 is configured to rest against a floor surface (not shown).

Figure 4:
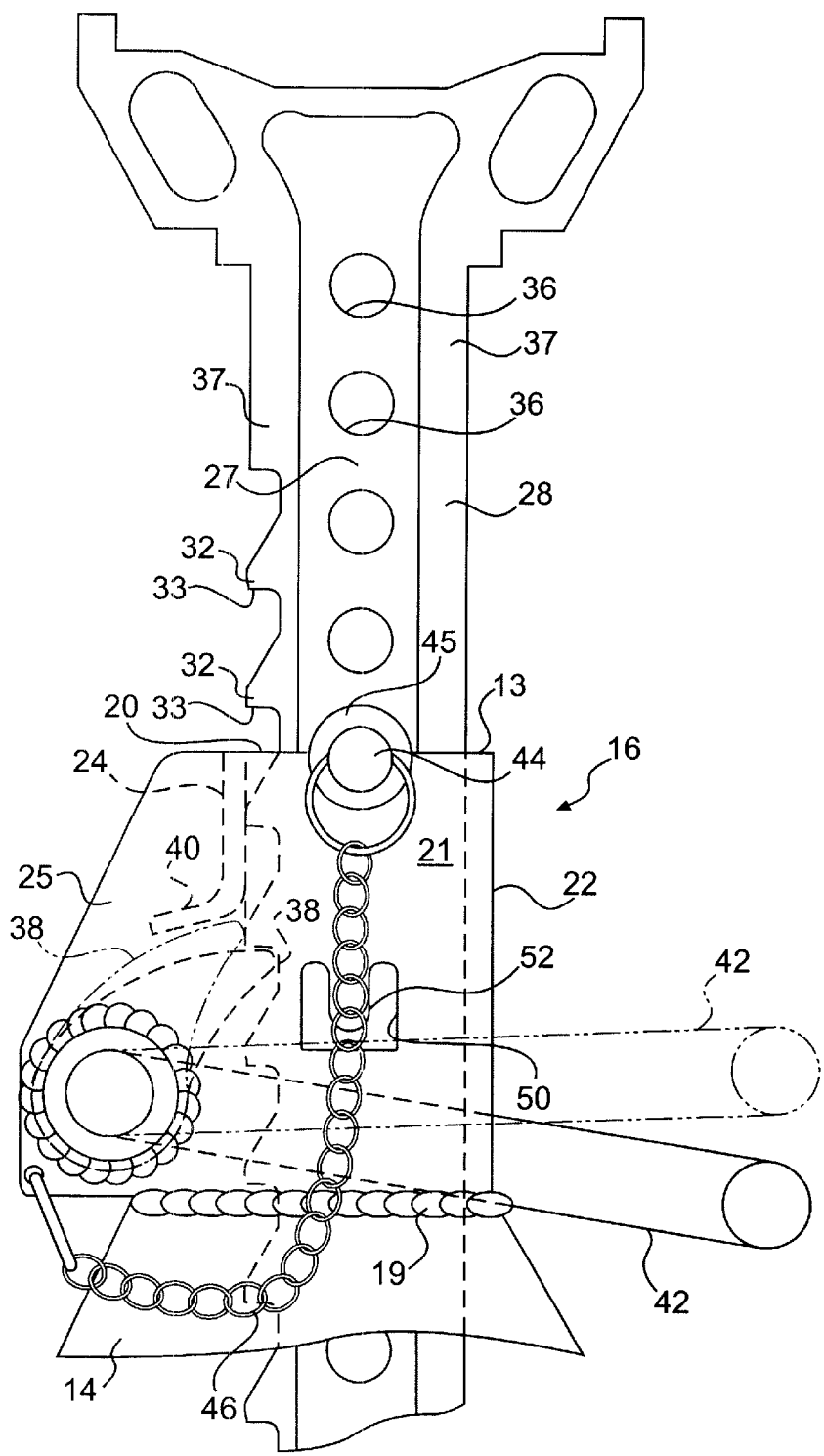
FIG. 4 is a side plan view with structure shown in phantom to illustrate operation of the pawl in relation to the lifting handle and the teeth of the ratchet bar.

As shown in FIGS. 1–3 for example, neck member 16 of jack stand body 12 is desirably defined by a hollow tubular member that has an hollow interior, is open at opposite ends and has a generally rectangular transverse cross-sectional profile. As shown in FIG. 4 for example, the upper free edge 13 of neck member 16 defines a slide opening 20. Neck member 16 has a lower edge that can be permanently attached to the uppermost edge of base member 14 as by welding 19. As shown in FIG. 1 for example, the neck member 16 is defined in part by a pair of opposed side panels 21, 23. As shown in FIGS. 2 and 3 for example, the neck member 16 is also formed by a front panel 22 disposed between the side panels. As shown in FIG. 1 for example, a rear panel 24 is disposed opposite the front panel and between the side panels 21, 23. As shown in FIG. 1 for example, a pair of opposed flanges 25, 26 can extend laterally from the side panels 21, 23 respectively, and beyond the rear panel 24 of neck member 16. Desirably, the front panel 22 and the two side panels 21, 23 with each of these respective flanges 25, 26 is formed from a single bent sheet of 20 gauge steel to which the rear panel 24 formed of the same material is permanently attached as by welding.

As shown in FIGS. 2, 3 and 4 for example, the jack stand includes an elongated ratchet bar 28 (a.k.a. ratchet post). The ratchet bar 28 is configured to be slidably received through the slide opening 20 defined by the upper edge 13 of neck member 16 and pass through the hollow interior of neck member 16 and into the hollow interior of base member 14. For a jack stand rated at 6-tons, the elongated portion of the ratchet bar can be formed from a steel I-bar that is two inches wide by one and one-half inches thick.

As shown in FIG. 2 for example, a saddle 30 is defined at one end of the ratchet bar 28, and at the opposite end of the ratchet bar there is a distal end 29. The saddle is configured in any known manner to receive and support on its upper face 31 the type of load that is intended to be supported by the jack stand. As shown in FIG. 3 for example, along a portion of one elongated side edge of the ratchet bar 28, there is defined a plurality of teeth 32 that are disposed side-by-side along this portion, which spans the majority of the length of the ratchet bar. In the embodiment shown, the spacing between the teeth 32 is uniform, as are the size and shape of each of the teeth. For a jack stand rated at 6-tons, the distance between the underside support surface 33 (FIG. 4) of adjacent teeth 32 can be on the order of one and one sixteenth inches. As shown in FIG. 2 for example, at the distal end 29 of the ratchet bar 28, there is a stop surface 34 that is configured and disposed for engaging a tab (described below).

As shown in FIGS. 2–4, the ratchet bar 28 defines a plurality of holes 36 that are disposed transversely therethrough. Each hole 36 has an entrance and an exit disposed opposite the entrance of the hole. The centers of the holes 36 are aligned with each other. Each hole 36 is spaced a predetermined distance from the nearest hole along the length of the ratchet bar 28. This predetermined distance is determined by the strength of the material forming the ratchet bar as well as the maximum load that is to be supported by the jack stand. For a jack stand rated at 6-tons, the distance between the center points of adjacent holes can be on the order of one and one sixteenth inches, and the diameter of the hole can be on the order of nine-sixteenths of an inch.

As shown in FIG. 4 for example, the neck member 16 of the jack stand body 12 defines a slide opening 20 that is configured to slidably receive therethrough, the elongated ratchet bar 28 in a manner that orients the ratchet bar with the axis of elongation of the ratchet bar disposed parallel to the vertical direction when the foot members are resting on the floor surface (not shown).

As shown in FIG. 4 in phantom (dashed line and chain-dashed line) a pawl 38 is pivotally connected to the jack stand body 12 and in particular to the flanges 23, 25 of the neck member 16 of the jack stand body. As depicted in dashed line in FIG. 4, the pawl 38 is pivotally connected to the jack stand body and configured and disposed in selective engaging with one of the teeth 32 of the ratchet bar 28 so as to prevent the ratchet bar from movement toward the foot members 18. The pawl 38 is also depicted in FIG. 4 in chain-dashed line to show an alternative orientation of the pawl 38 that does not permit pawl 38 to engage any teeth 32 and therefore does not prevent vertical movement of the ratchet bar 28. A stop member 40 is also shown in FIG. 4 in dashed line and is configured and disposed to limit movement of the pawl 28 from being rotated past stop member 40.

As shown in FIGS. 1–4, the jack stand includes a lifting handle 42 that is pivotally mounted to the jack stand and in particular to the neck member 16 of the body. As shown in FIG. 4, lifting handle 42 is non-rotatably connected to the pawl 38 so that as the handle moves about its axis of rotation 43 (FIG. 1), so too does the pawl 38 move about the same axis of rotation 43. Moreover, the lifting handle 42 is configured and disposed for biasing the pawl 38 in a manner so that the pawl engages at least one of the teeth 32 of the ratchet bar 28 when the ratchet bar is disposed through the slide opening 20 and extending into the interior of the neck member 16. When the pawl is so engaged with one of the teeth 32, this prevents the ratchet bar from movement toward the foot member 18. This orientation of the lifting handle 42 is biased by the gravitational force acting on the handle and is shown partly in solid line and partly in dashed line in FIG. 4. As shown in dashed line in FIG. 4, the pawl 38 is oriented so as to engage the support surface 33 of one of the teeth shown in dashed line in FIG. 4.

The chain-dashed line depiction of the lifting handle 42 in FIG. 4 shows the lifting handle being configured and disposed to be selectively positionable so as to release the pawl 38 from engaging the teeth 32 of the ratchet bar 28. This release position of the pawl 38 relative to the teeth 32 is also shown in chain-dashed line in FIG. 4. The mechanic would lift the handle 42 in opposition to the force of gravity in order to disengage the pawl from the teeth of the ratchet post 28.

As shown in FIGS. 2 and 3 for example, a safety pin 44 is configured to be removably received within each of the plurality of holes 36 of the ratchet bar 28. When the holes 36 are circular, then as shown in FIG. 2, the pin 44 defines a circular cylindrical shape. The pin 44 is configured to be positionable so as to protrude beyond each entrance and exit of each hole 36 of the ratchet bar 28 when the pin is removably received in the hole. The pin 44 is shown in dashed line in FIG. 3 when it is removed from insertion through one of the holes 36 and in solid line when it is inserted through one of the holes in the ratchet bar 28. As shown in FIGS. 2 and 4, one end of pin 44 has a collar 45 that is larger than the entrance (and exit) of the hole 36 of the ratchet bar 28 and prevents insertion of the pin into the hole beyond the collar. In order to avoid misplacing the pin 44 when it is not inserted into a hole 36 in the ratchet post 28, the pin is attached to the neck member 16 via an elongated tether 46 such as a metal chain or a piece of cord or elastic membrane.

As shown in FIGS. 1 and 2 for example, the body 12 defines at least one pair of pin support sections 48, 49. Each pin support section 48 or 49 defines a semi-circular cut out formed in the upper edge 13 of one of the side panels 21, 23 of the neck member 16 of the body 12. Thus, for the configuration of the safety pin shown, each pin support section 48, 49 is configured to receive and support the safety pin 44 when the safety pin is positioned to protrude beyond each entrance and exit of each hole 36 defined in the ratchet bar 28. A first pin support section 49 is disposed on the side panel 21 of the neck member 16 defining one side of the slide opening as shown in FIG. 2. As shown in FIG. 1, a second pin support section 48 is disposed on the opposite side panel 23 of the neck member 16 of the body 12 and is aligned with the first pin support section 49. Thus, together the pair of pin support sections 48, 49 straddle the slide opening formed by the neck member 16 of the jack stand body 12. Moreover, considering the typically elevated perspective of the mechanic, because the support section 48, 49 is defined as a bottom half of a circle, there is no upper half of the support section to obscure the hole 36 in the ratchet bar 28 from the mechanic's view. Thus, the mechanic can easily see when the support sections 48, 49 are aligned with the hole 36 in the ratchet bar 28 that is targeted for purposes of insertion of the pin 44 into the hole.

As shown in FIGS. 2–4 for example, the locations of the holes 36 in the ratchet post 28 and the locations of the teeth 32 along one elongated edge of the ratchet post are coordinated with one another and with the pawl 38 that is pivotally mounted in the neck member 16 in a particular spatial relationship so that any engagement between the pawl 38 and a tooth 32 on the post 28 ensures that a hole 36 in the post is precisely aligned with the pair of pin support sections 48, 49 in the body 12 of the jack stand 10. In this way, the mechanic is assured that when the pawl 38 is engaged, then the pin support sections 48, 49 in the neck member 16 of the jack stand are going to be sufficiently aligned with one of the holes 36 in the ratchet post 28 for purposes of insertion of the pin 44 into the hole 36 so as to be supported by the pin support sections 48, 49.

Figure 5A:
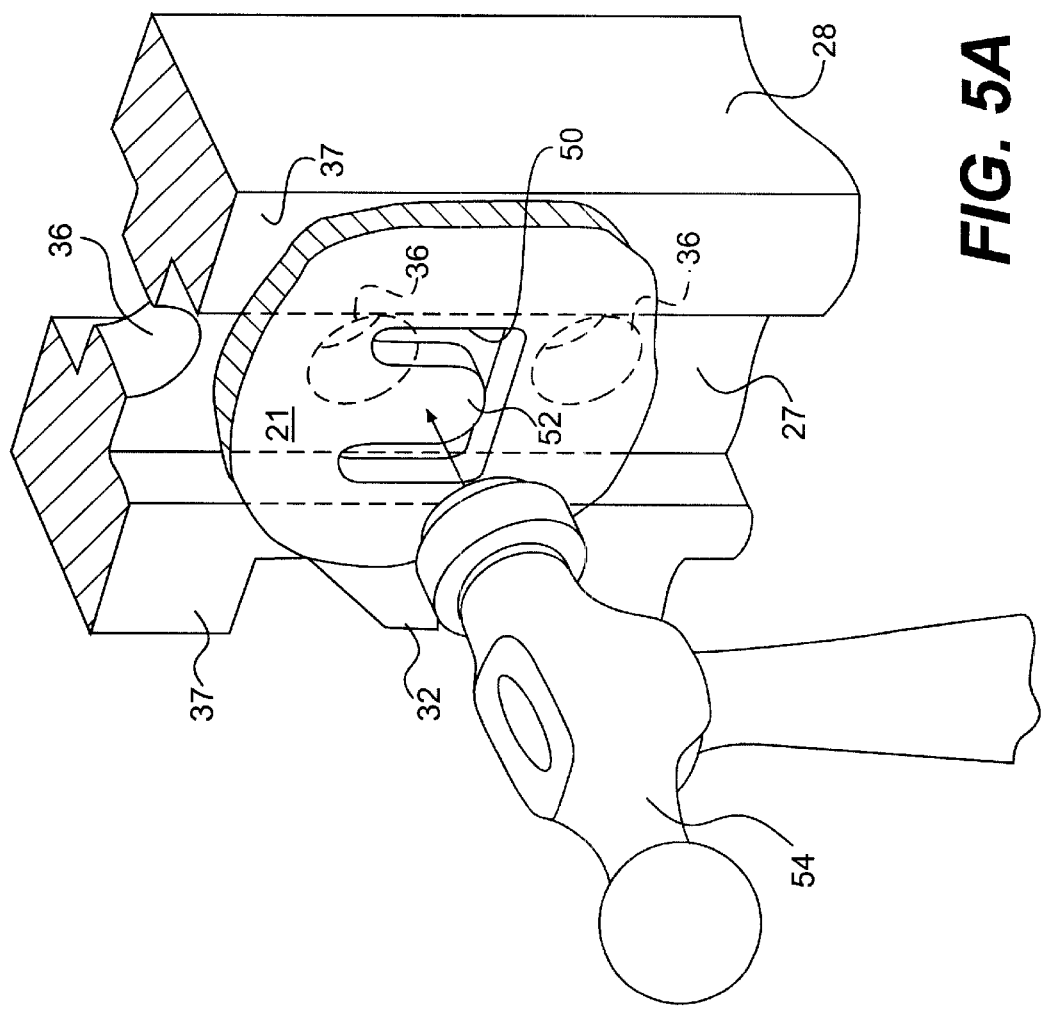
FIG. 5A is an enlarged view of a partial section of the perspective view shown in FIG. 2.

As shown in FIGS. 2 and 5A for example, a U-shaped slot 50 is defined through one of the side panels 21 forming the neck member 16. This slot 50 isolates and defines a tab 52.

The purpose of this tab 52 is to permit the assembler of the jack stand to punch the tab inwardly to project into the interior space defined within the neck member 16.

Figure 5B:
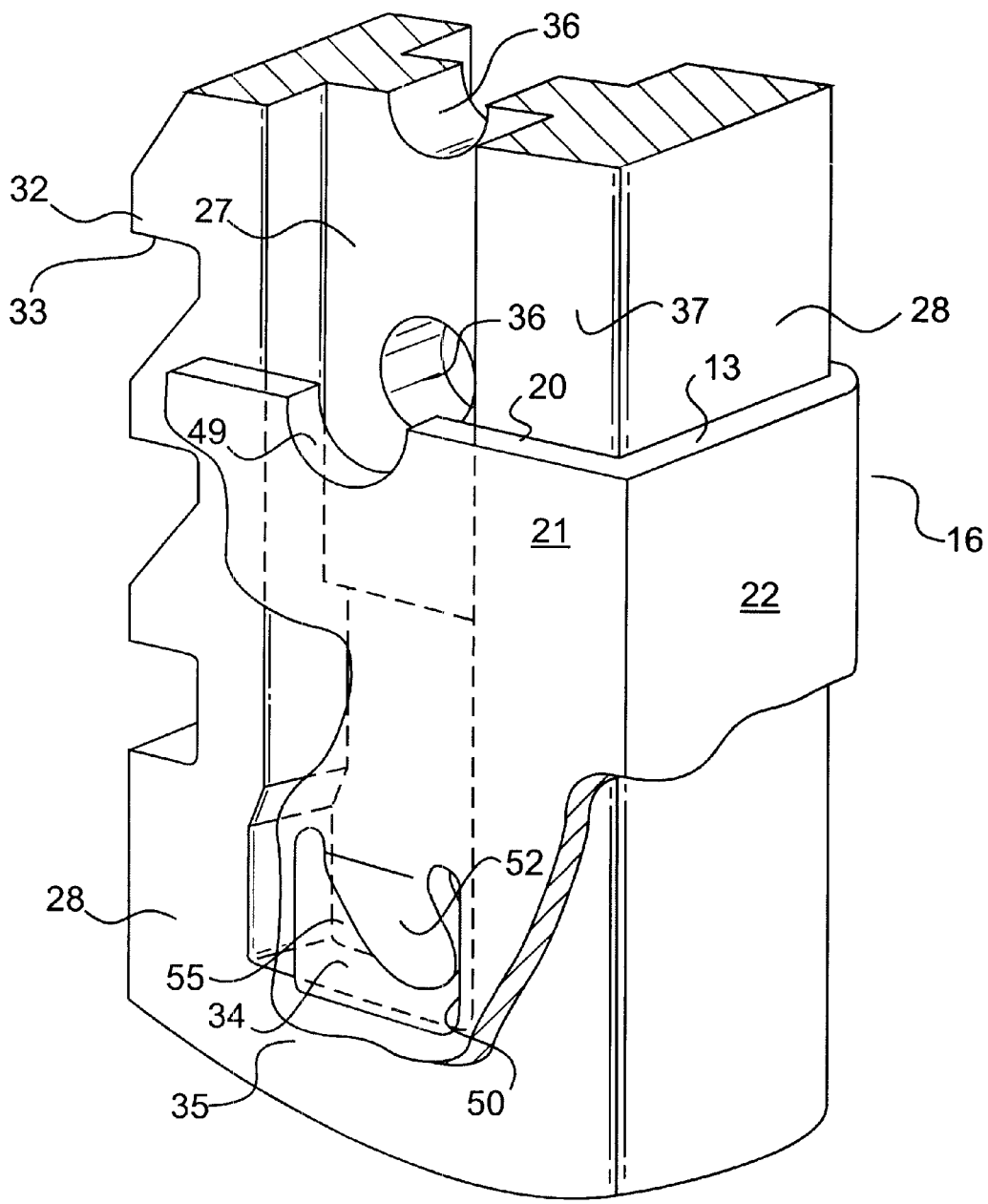
FIG. 5B is an enlarged partial section of the perspective view of FIG. 3.

As shown in FIGS. 2 and 5B, the distal end 29 of the ratchet bar 28 defines a horizontally disposed stop flange 35. The jack stand can be shipped with the ratchet bar 28 disassociated from the body 12 of the jack stand in order to reduce the size of the shipping carton and facilitate packing the jack stand inside the carton. Once the jack stand arrives at the destination where it is to be used, the assembler of the jack stand inserts the ratchet bar 28 into the slide opening 20 of the neck member 16 and allows the underside of the saddle 30 to rest against the upper edge 13 of the neck member 16. As shown in FIG. 5A, the assembler can use a hammer 54 (with or without a punch) to force the tab 52 into the interior of the neck member 16. As shown in FIG. 5B, with the tab 52 so oriented to project into the interior 55 of the jack body, the stop flange 35 at the distal end 29 of the ratchet bar 28 cannot bypass the inwardly projecting tab 52 as the saddle 30 of the ratchet bar 28 is lifted toward its maximum elevation. Moreover, because the central portions 27 of the ratchet bar 28 are recessed from the side edges 37 (FIG. 4), the tab 52 does not interfere with any of the holes 36.

As an alternative to tab 52, it is contemplated that a removable screw or a roll-pin or the like can be used to secure the ratchet bar 28 in the body 12.

While a preferred embodiment of the invention has been described using specific terms, such description is for illustrative purposes only, and it is to be understood that changes and variations may be made without departing from the spirit or scope of the following claims.

What is claimed is:

1. A jack stand, comprising:
   a jack stand body defining a base member and a neck member connected to said base member;
   an elongated ratchet bar defining at one end a cradle and defining a distal end opposite said cradle, one elongated side edge of said ratchet bar defining a plurality of teeth disposed side-by-side along most of the length of said ratchet bar;
   said base member defining at least one foot member configured to rest against a floor surface;
   said neck member defining a slide opening configured to slidably receive therethrough said elongated ratchet bar in a manner that orients said elongated ratchet bar with its axis of elongation parallel to the vertical direction when said foot member is resting on the floor surface;
   a pawl pivotally connected to said jack stand body;
   a lifting handle connected to said pawl and configured and disposed for biasing said pawl in a manner so that said pawl engages at least one of said teeth when said ratchet bar is disposed in said slide opening and thereby prevents said ratchet bar from movement toward said foot member;
   said lifting handle being further configured and disposed to be selectively positionable so as to release said pawl from engaging said teeth of said ratchet bar;
   said ratchet bar defining a plurality of holes disposed transversely therethrough and spaced at predetermined distances along the length of said ratchet bar, each said hole having an entrance and an exit disposed opposite said entrance;
   a safety pin configured to be removably received within each of said plurality of holes of said ratchet bar and positionable to protrude beyond each said entrance and said exit of each said hole when removably received therein;
   said body defining at least one pair of pin support sections, a first said pin support section being disposed on one side of said slide opening and a second said pin support section being disposed on the opposite side of said slide opening and aligned with said first said pin support section, each said pin support section being configured to receive and support said safety pin when said safety pin is positioned to protrude beyond each said entrance and said exit of each said hole; and
   wherein the locations of said holes of said ratchet bar and the locations of said teeth of said ratchet bar are coordinated with one another and with said pawl in a particular spatial relationship so that any engagement between said pawl and one of said teeth of said ratchet bar ensures that one of said holes in said ratchet bar is precisely aligned with said pair of pin support sections in said jack stand body.

2. An adjustable jack stand for supporting a load above a floor surface, comprising:
   a jack stand body defining a base member and a neck member connected to said base member;
   said jack stand body defining a hollow interior and said base member defining at least one foot member configured to rest against the floor surface;
   an elongated ratchet bar defining an elongated side edge, said elongated side edge further defining a first portion, said first portion of said one elongated side edge of said ratchet bar defining a plurality of teeth disposed side-by-side along the length of said first portion;
   said neck member defining a slide opening, said ratchet bar having said first portion being slideably received within said slide opening in a manner that orients said elongated ratchet bar with its axis of elongation parallel to the vertical direction when said foot member is resting on the floor surface;
   a pawl pivotally connected to said jack stand body and configured and disposed for selectively engaging at least one of said teeth of said ratchet bar so as to prevent said ratchet bar from movement toward said foot member;
   a lifting handle connected in communication with said pawl and configured and disposed to be selectively positionable so as to release said pawl from engaging said teeth of said ratchet bar;
   said neck member defining at least one pair of pin support sections, a first said pin support section being disposed on one side of said slide opening and a second said pin support section being disposed on the opposite side of said slide opening and aligned with said first said pin support section;
   a safety pin disposed to engage both said ratchet bar and said pin support sections of said neck member in a manner that prevents said ratchet bar from vertical movement toward said foot member, said safety pin being configured to be selectively removable from said engaged disposition in a manner that permits said ratchet bar vertical movement toward said foot member; and
   wherein the locations of said holes of said ratchet bar and the locations of said teeth of said ratchet bar are coordinated with one another and with said pawl in a particular spatial relationship so that any engagement between said pawl and one of said teeth of said ratchet bar ensures that one of said holes in said ratchet bar is precisely aligned with said pair of pin support sections in said jack stand body.

3. An adjustable jack stand for supporting a load above a floor surface, comprising:

a jack stand body defining a hollow interior and defining at least one foot member configured to rest against the floor surface;

an elongated ratchet bar defining an elongated side edge, said elongated side edge further defining a first portion, said first portion of said one elongated side edge of said ratchet bar defining a plurality of teeth disposed side-by-side along the length of said first portion;

said jack stand body defining a slide opening, said ratchet bar having said first portion being slidably received within said slide opening in a manner that orients said elongated ratchet bar with its axis of elongation parallel to the vertical direction when said foot member is resting on the floor surface;

a pawl pivotally connected to said jack stand body and configured and disposed for selectively engaging at least one of said teeth of said ratchet bar so as to prevent said ratchet bar from movement toward said foot member;

a lifting handle connected in communication with said pawl and configured and disposed to be selectively positionable so as to release said pawl from engaging said teeth of said ratchet bar;

said ratchet bar defining a plurality of holes disposed transversely therethrough and spaced at predetermined distances along the length of said ratchet bar, each said hole having an entrance and an exit disposed opposite said entrance;

a safety pin removably disposed within one of said plurality of holes of said ratchet bar and configured to be removably received within each of said plurality of holes of said ratchet bar and selectively positionable to protrude beyond each said entrance and said exit of each said hole when removably received therein;

wherein said jack stand body defining at least one pair of pin support sections, a first said pin support section being disposed on one side of said slide opening and a second said pin support section being disposed on the opposite side of said slide opening and aligned with said first said pin support section, each said pin support section being configured to receive and support said safety pin when said safety pin is positioned to protrude beyond each said entrance and said exit of each said hole of said ratchet bar; and wherein the locations of said holes of said ratchet bar and the locations of said teeth of said ratchet bar are coordinated with one another and with said pawl in a particular spatial relationship so that any engagement between said pawl and one of said teeth of said ratchet bar ensures that one of said holes in said ratchet bar is precisely aligned with said pair of pin support sections in said jack stand body.

4. The jack stand as in claim 3, wherein said pin defines a circular cylindrical shape and each said pin support section defines a semi-circular shape.

5. The jack stand as in claim 3, further comprising an elongated tether having one section connected to said body and a section connected to said pin.

6. The jack stand as in claim 3, wherein said lifting handle is non-rotatably connected to said pawl.

7. The jack stand as in claim 3, wherein each said entrance and exit of each said hole of said ratchet bar is recessed.

8. The jack stand as in claim 3, further comprising:

a cradle defined at one end of said ratchet bar and a distal end defined at an end of said ratchet bar opposite said cradle;

a stop flange defined in said distal end of said ratchet bar; and a tab defined in said jack stand body and configured to be selectively disposed to project into said interior of said jack stand body so as to prevent said stop flange from bypassing said inwardly projecting tab as said ratchet bar is lifted toward its maximum elevation.

* * * * *